United States Patent [19]
Hammer

[11] 3,991,991
[45] Nov. 16, 1976

[54] QUICK-ADJUSTABLE FENCE UNIT FOR A WOODWORKING TABLE

[76] Inventor: Waldemar Hammer, 3730 Greencrest Drive, Santa Rosa, Calif. 95403

[22] Filed: Oct. 20, 1975

[21] Appl. No.: 623,601

[52] U.S. Cl. .............................................. 269/318
[51] Int. Cl.² ........................................ A61G 13/00
[58] Field of Search ........................ 269/315–320; 83/467 A, 467 R, 471

[56] References Cited
UNITED STATES PATENTS

| | | | |
|---|---|---|---|
| 419,884 | 1/1890 | Richards | 269/315 |
| 427,035 | 5/1890 | Benedict | 269/318 |
| 1,267,447 | 5/1918 | Phelan | 269/318 |
| 1,727,979 | 9/1929 | Hunt | 269/208 |
| 2,618,300 | 11/1952 | Frevdenthaler | 269/318 |
| 2,789,596 | 4/1957 | Barnes et al. | 83/467 |

Primary Examiner—Al Lawrence Smith
Assistant Examiner—Robert C. Watson
Attorney, Agent, or Firm—Roger B. Webster

[57] ABSTRACT

A fence unit, for a woodworking table, comprised of a fence extending along the table spaced in front of an attachment plate fixed on the table, and instrumentalities, including parallel links, connected between the attachment plate and fence releasably holding said fence in one preselected working position, but manually operative to release said fence and quick-adjust the same to another, releasably held, preselected working position.

7 Claims, 4 Drawing Figures

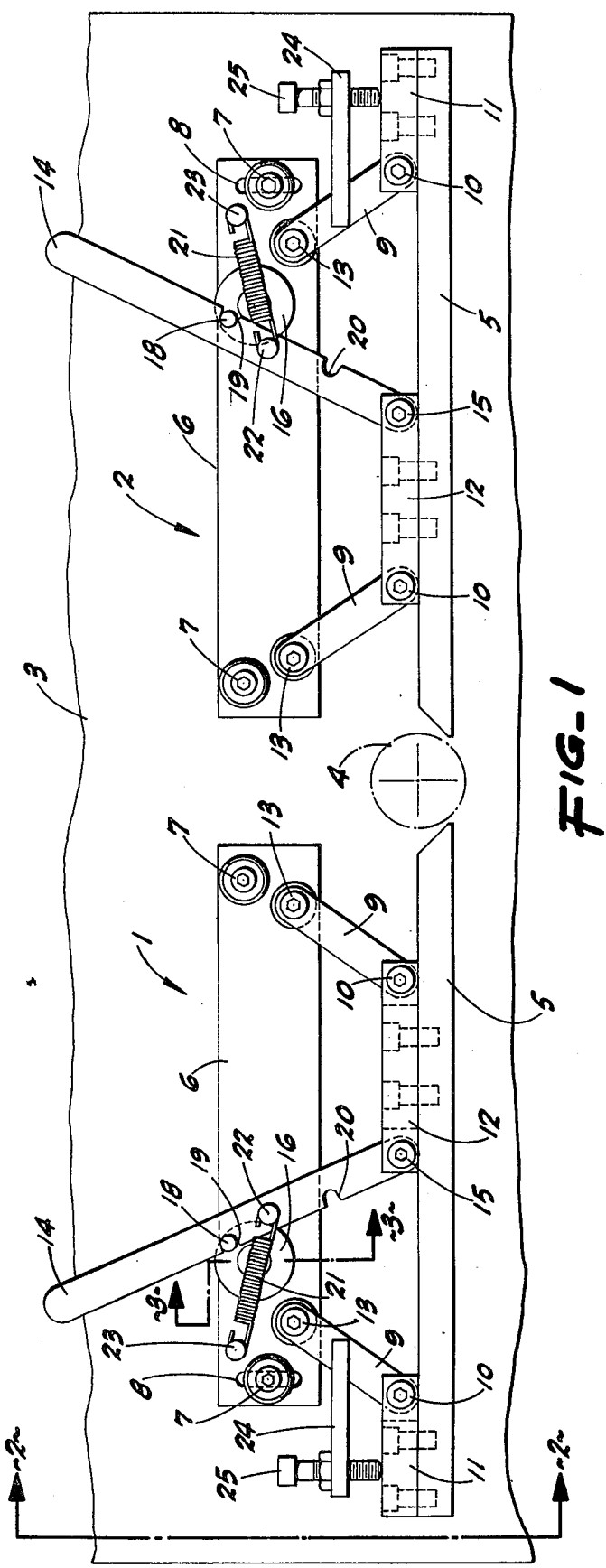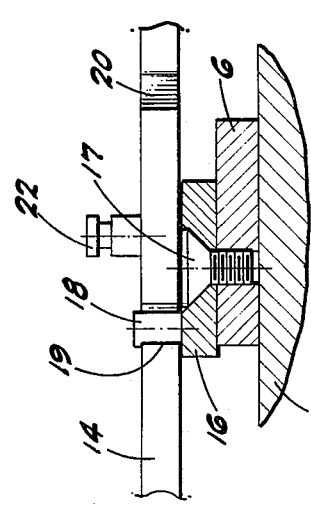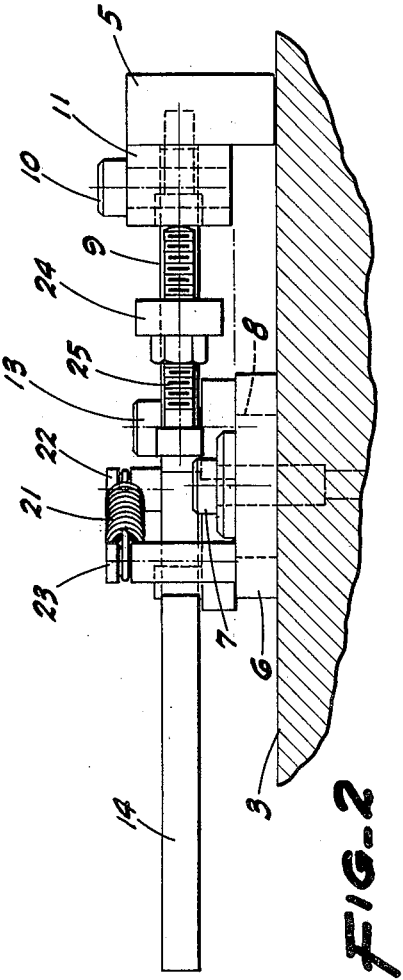

QUICK-ADJUSTABLE FENCE UNIT FOR A WOODWORKING TABLE

BACKGROUND OF THE INVENTION

In cabinet manufacturing shops, for example, a fence may be used only in one position for a certain work step and in another position for a separate work step, on a shaper or router table, or a circular saw table. Heretofore, the adjustment of the fence between such positions posed a problem as it required substantial time and manual effort — usually with the aid of tools — to make such adjustment. The present invention was conceived by me in a successful effort to solve such problem.

SUMMARY OF THE INVENTION

The present invention provides, as a major object, a fence unit, for a woodworking table, constructed so that the fence while normally held in one preselected working position, is — without the use of tools and wholly manually with ease — quick-adjustable to another preselected working position.

The present invention provides, as another important object, a fence unit, for a woodworking table, which is comprised of a fence extending along the table spaced in front of an attachment plate fixed on the table, and instrumentalities, including parallel links, connected between the attachment plate and fence releasably holding said fence in one preselected working position, but manually operative to release said fence and quick-adjust the same to another, releasably held, preselected working position.

The present invention provides, as still another important object, a fence unit — as above — wherein said instrumentalities include a vernier adjusting device whereby the working positions of the fence can be very accurately preselected, or subsequently fine-adjusted, as working conditions may require.

The present invention provides, as a further object, a quick-adjustable fence unit for a woodworking table which is designed for ease and economy of manufacture.

The present invention provides, as a still further object, a practical, reliable, and durable quick-adjustable fence unit for a woodworking table, and one which is exceedingly effective for the purpose for which it it designed.

BRIEF DESCRIPTION OF THE DRAWINGS

FIG. 1 is a plan view showing a pair of the fence units as mounted on a woodworking table.

FIG. 2 is a transverse outer end elevation of one of such fence units; the view being taken substantially on line 2—2 of FIG. 1.

FIG. 3 is a transverse sectional elevation taken substantially on line 3—3 of FIG. 1.

DESCRIPTION OF THE PREFERRED EMBODIMENT

Figure 4:
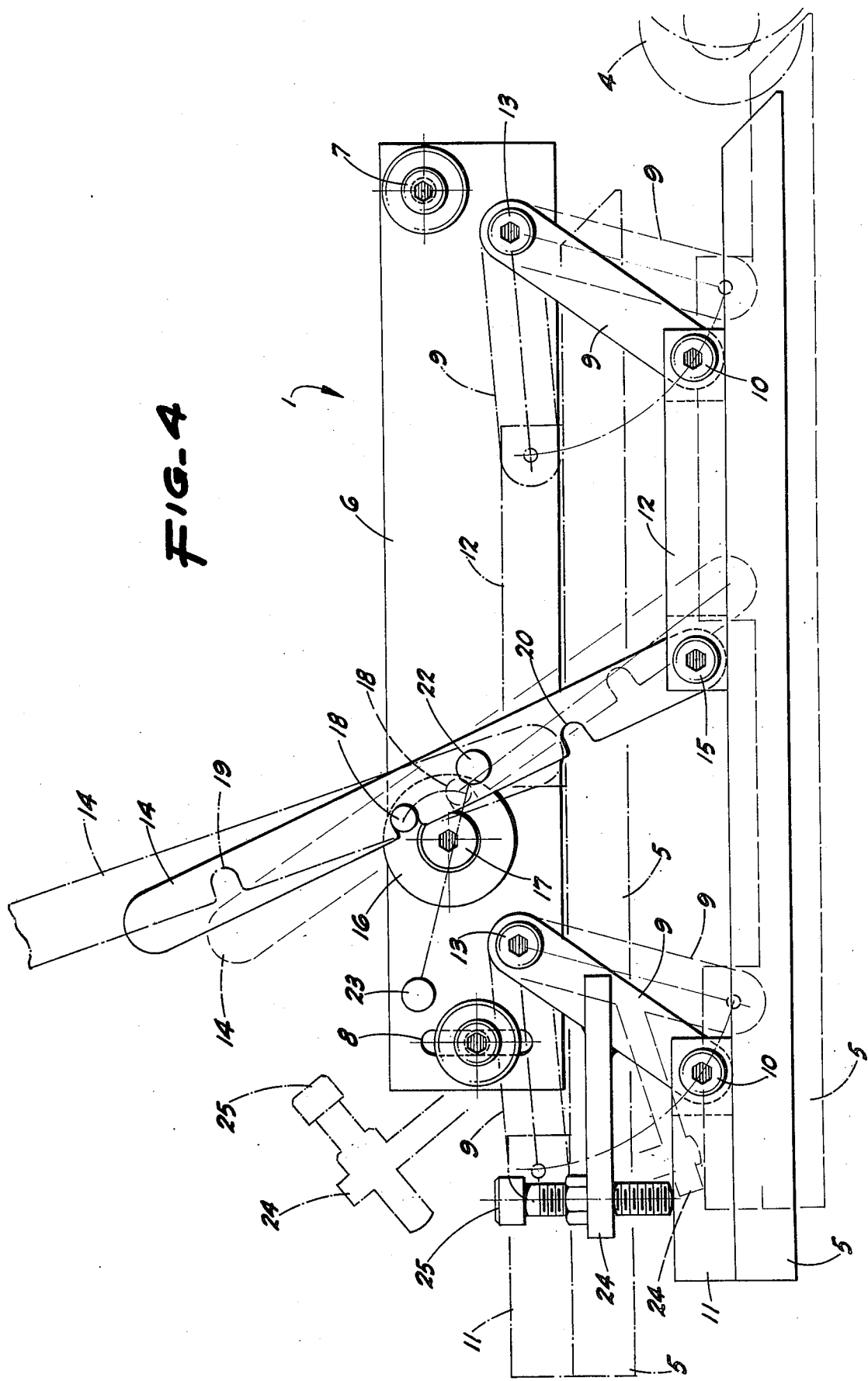
FIG. 4 is an enlarged plane view of said one fence unit; the view showing, in full and broken lines, different positions of the fence.

Referring now more particularly to the drawings and to the characters of reference marked thereon, a pair of the fence units, indicated generally at 1 and 2, are used on a woodworking table 3; the fence unit 1 being downstream relative to the driven rotary woodworking member 4 (such as a router head), while the fence unit 2 is upstream relative to such member 4.

The fence units each include a longitudinal, straight-edge fence 5, and such fences are in endwise alinement but gapped at adjacent ends with the woodworking member 4 disposed therebetween. The adjacent ends of the fences 5 are beveled, as shown, in order to permit of close approach to a forward peripheral portion of the woodworking member 4.

As the fence units 1 and 2 are of like construction except for being right and left-hand, a description of one will suffice for both.

Each such fence unit comprises, in addition to the longitudinal, straight-edge fence 5, a longitudinal attachment plate 6 disposed rearwardly of the fence in spaced, parallel relation; such attachment plate being fixed on the woodworking table 3 by end-positioned bolts 7, one of which extends through an elongated slot 8 to permit of initial proper setting of said attachment plate.

Longitudinally spaced, parallel links 9 span between the fence 5 and attachment plate 6; such links being vertically pivoted at their forward ends, as at 10, to blocks 11 and 12 fixed on the rear of the fence, while the links are vertically pivoted at their rearward ends, as at 13, to the attachment plate 6. As shown, the parallel links 9 extend — from the attachment plate 6 — at a forward diagonal in a direction away from the woodworking member 4.

An elongated, fence-positioning arm 14 is disposed intermediate the links 9 and extends rearwardly from the block 12 at a diagonal opposite to that of said links 9; the arm 14 being vertically pivoted at its forward end to block 12, as at 15.

Intermediate its ends, the fence-positioning arm 14 overlies a horizontal disc 16 normally fixedly, but rotatably adjustably, secured on the attachment plate 6 by means of an axial or center bolt 17. A radially offset pin 18 is fixed on and upstands from the disc 16 on the side thereof adjacent the fence-positioning arm 14; the latter having longitudinally spaced notches 19 and 20 therein opening to the edge corresponding to said pin 18, and into one which notches such pin 18 normally engages.

The fence-positioning arm 14 is normally urged toward the pin 18 — to hold said pin in one or the other of the notches 19 and 20 — by means of a tension spring 21 spanning over disc 16 and connected between an anchor 22 on arm 14 and a fixed pin 23 which upstands from the attachment plate 6.

By reason of the structure of each fence unit, the fence 5 — as carried by the parallel links 9 — can be readily and quickly adjusted from an advanced working position to a retracted working position, but with the arm 14 — acting as a stiff-arm — normally holding the fence 5 rigidly against accidental and undesired motion from either of such positions. In the advanced position of the fence 5, pin 18 is engaged in notch 19, while in the retracted position of the fence, said pin 18 is engaged in notch 20.

To adjust the fence 5 from one working position to the other, the operator merely manually engages the rear portion of arm 14, shifts it laterally (against spring 21) to disengage pin 18 from the notch (19 or 20) in which the pin rests, and then imparts lengthwise motion to the arm in a direction to cause the pin 18 to aline with and snap-engage into the other notch.

Also, upon adjustment — as above — of the fence 5 to its advanced working position or its retracted working position, such fence assumes, in each such position, an exact or precise predetermined setting without any manual resetting by the operator.

Prior to use of each fence unit, the setting of its advanced working position can be predetermined by rotatively adjusting the disc 16 and which varies the position of pin 18 in a front-to-rear direction, with consequent adjustment of the "reach" of the fence-positioning arm 14 when said pin 18 is engaged in notch 19. Such presetting of the advanced working position of the fence 5 correspondingly varies, of course, the retracted working position thereof.

When the fence 5 is adjusted from its advanced working position to its retracted working position, the links 9 cause such fence to not only move rearwardly, but longitudinally away from the rotary woodworking member. The dash-dot lines in FIG. 4 represent the parts as disposed when the fence 5 is in said retracted working position, while in said view the full lines illustrate the disposition of the parts when the fence is in advanced working position. The broken lines in FIG. 4 show the disposition of the parts when a further advanced working position of the fence 5 is attained by additional adjustment of disc 16; such further advanced working position being used, for example, when the member 14 is of smaller size.

In order to preclude the pin 18 (during manual advancing of the fence) from rearwardly overrunning the notch 19 with attendant excessive advance of the fence 5, and which could cause damaging engagement of the near end of the fence with the rotary woodworking member 14, one link 9 is provided with a rigid finger 24 which carriers a tranverse, adjustable, safety-stop screw 25; the latter bearing in stop motion relation against the block 11 when the fence 5 reaches its predetermined advanced working position.

From the foregoing description, it will be readily seen that there has been produced such a quick-adjustable fence unit for a woodworking table as substantially fulfills the objects of the invention, as set forth herein.

While this specification sets forth in detail the present and preferred construction of the quick-adjustable fence unit for a woodworking table, still in practice such deviations from such detail may be resorted to as do not form a departure from the spirit of the invention as defined by the appended claims.

I claim

1. A quick-adjustable fence unit, for a woodworking table, comprising an attachment plate on the table, means fixedly securing the attachment plate to the table, a fence extending along the table spaced in front of the attachment plate, spaced parallel links pivotally connected between the attachment plate and fence to provide for movement of said fence between one preselected working position and another preselected working position, fence-positioning instrumentalities between the attachment plate and fence releasably holding the latter in either of said positions but manually operative to release said fence and quick-adjust the same to the other of said positions; said fence-positioning instrumentalities comprising an elongated arm disposed intermediate the links and spanning between the fence and the attachment plate, means securing the forward end of the arm in connected with the fence, and holding means between the attachment plate and the arm operative to normally and selectively, but manually releasably, maintain the arm in either of said working positions.

2. A fence unit, as in claim 1, in which the securing means includes a pivot which permits lateral horizontal motion of the arm; and said holding means comprises an upstanding pin, means normally fixedly mounting the pin in connection with the attachment plate and adjacent one edge of the arm, said arm being notched from said edge at longitudinally spaced points, the pin being selectively engageable in said notches upon longitudinal motion of the arm followed by lateral motion thereof in one direction, and spring means yieldably urging the arm in such direction.

3. A fence unit, as in claim 2, in which the pin-mounting means provides for positional adjustment of said pin in a direction generally longitudinal of the arm.

4. A fence unit, as in claim 3, in which the pin-mounting means is a disc seated on the attachment plate, the pin upstanding from the disc, and a center bolt securing the disc to the attachment plate in normally non-rotatable relation.

5. A quick-adjustable fence unit, for a woodworking table, comprising an attachment plate on the table, means fixedly securing the attachment plate to the table, a fence extending along the table spaced in front of the attachment plate, spaced parallel links pivotally connected between the attachment plate and fence to provide for movement of said fence between one preselected working position and another preselected working position, fence-positioning instrumentalities between the attachment plate and fence releasably holding the latter in either of said positions but manually operative to release said fence and quick-adjust the same to the other of said positions; the fence being advanced in said one working position, and said fence unit including a safety stop mounted on one link and engageable with the fence to prevent advancing motion thereof beyond said one working position.

6. A quick-adjustable fence unit, for a woodworking table, comprising an attachment plate on the table, means fixedly securing the attachment plate to the table, a fence extending along the table spaced in front of the attachment plate, spaced parallel links pivotally connected between the attachment plate and fence to provide for movement of said fence between one preselected working position and another preselected working position, fence-positioning instrumentalities between the attachment plate and fence releasably holding the latter in either of said positions but manually operative to release said fence and quick-adjust the same to the other of said positions; the fence-positioning instrumentalities comprising an elongated arm vertically pivoted at its forward end in connection with the fence intermediate the links, the arm thence extending rearwardly and overlying the attachment plate, longitudinally spaced notches opening to one edge of the arm, an upstanding pin adjacent such notched edge of the arm, mounting the upstanding pin in connection with the attachment plate, the pin normally being selectively engaged in one notch or the other whereby to then dispose the arm with the fence in said one working position or the other working position, and spring means connected to the arm and normally but yieldably urging the arm in a direction to hold the pin in notch engagement.

7. A fence unit, as in claim 6, in which the pin-mounting means includes a pin-supporting element normally fixedly mounted on the attachment plate but adjustable to alter the position of the pin in a to and fro direction.

* * * * *